United States Patent
Rajaraman et al.

(10) Patent No.: US 10,810,556 B2
(45) Date of Patent: Oct. 20, 2020

(54) SYSTEMS AND METHODS FOR MANAGING RECEIPTS FOR PAYMENT ACCOUNT TRANSACTIONS

(71) Applicant: MASTERCARD INTERNATIONAL INCORPORATED, Purchase, NY (US)

(72) Inventors: Venkataraman Rajaraman, Chesterfield, MO (US); Erica Joann Robeen, Hardin, IL (US); Mrutunjaya Mishra, Bloomington, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 446 days.

(21) Appl. No.: 15/441,589

(22) Filed: Feb. 24, 2017

(65) Prior Publication Data

US 2018/0247281 A1    Aug. 30, 2018

(51) Int. Cl.
*G06Q 20/40* (2012.01)
*G06Q 20/04* (2012.01)

(52) U.S. Cl.
CPC .......... *G06Q 20/047* (2020.05); *G06Q 20/40* (2013.01)

(58) Field of Classification Search
CPC ...... G06Q 40/02; G06Q 20/322; G06Q 20/40; G06Q 20/3224; G06Q 40/00; G06Q 30/0601
See application file for complete search history.

(56) References Cited

U.S. PATENT DOCUMENTS

| | | | | |
|---|---|---|---|---|
| 7,992,781 B2* | 8/2011 | Hammad | ............. | G06Q 20/042 235/375 |
| 2001/0029483 A1 | 10/2001 | Schultz et al. | | |
| 2003/0126094 A1* | 7/2003 | Fisher | .................... | G06Q 20/02 705/75 |
| 2010/0257066 A1* | 10/2010 | Jones | ................... | G06Q 20/202 705/17 |
| 2011/0145082 A1* | 6/2011 | Hammad | ............. | G06Q 20/042 705/24 |
| 2011/0161230 A1* | 6/2011 | Singh | ..................... | G06Q 20/20 705/44 |
| 2014/0052618 A1 | 2/2014 | Drozd et al. | | |
| 2014/0095985 A1 | 4/2014 | Argue et al. | | |
| 2014/0122270 A1 | 5/2014 | Argue et al. | | |
| 2014/0122276 A1 | 5/2014 | Argue et al. | | |
| 2014/0337175 A1* | 11/2014 | Katzin | ................ | G06Q 20/204 705/26.62 |

(Continued)

*Primary Examiner* — Mike Anderson
(74) *Attorney, Agent, or Firm* — Harness, Dickey & Pierce, P.L.C.

(57) ABSTRACT

Systems and methods for use in managing receipts associated with payment account transactions are disclosed. One exemplary method includes intercepting, by a computing device, an authorization message associated with a transaction involving a payment account and a merchant. The method also includes accessing, by the computing device, a profile for the payment account where the profile includes a vault location in a receipt vault data structure specific to the payment account, and appending, by the computing device, the vault location to the authorization message, whereby the merchant is permitted to deposit a receipt for the transaction at the vault location in the receipt vault data structure.

12 Claims, 3 Drawing Sheets

(56) References Cited

U.S. PATENT DOCUMENTS

| | | | |
|---|---|---|---|
| 2015/0100495 A1* | 4/2015 | Salama | G06Q 20/405 |
| | | | 705/65 |
| 2015/0278814 A1* | 10/2015 | Jaffe | G06Q 20/3276 |
| | | | 705/44 |
| 2015/0287037 A1* | 10/2015 | Salmon | G06Q 20/4016 |
| | | | 705/44 |
| 2016/0034900 A1* | 2/2016 | Nelsen | G06Q 20/4016 |
| | | | 705/44 |
| 2016/0092872 A1* | 3/2016 | Prakash | G06Q 20/3829 |
| | | | 705/65 |

* cited by examiner

SYSTEMS AND METHODS FOR MANAGING RECEIPTS FOR PAYMENT ACCOUNT TRANSACTIONS

FIELD

The present disclosure generally relates to systems and methods for managing receipts for payment account transactions, and in particular, for appending the receipts to receipt vaults from which the receipts can be subsequently retrieved by consumers and/or merchants involved in the underlying payment account transactions.

BACKGROUND

This section provides background information related to the present disclosure which is not necessarily prior art.

Merchants often offer products (e.g., goods and services, etc.) for sale to consumers. The products may be purchased (and funded) by the consumers through a variety of means including, for example, payment accounts. In connection with such transactions, regardless of the means in which they are funded, receipts are often issued to the consumers representing the purchases. In particular, brick-and-mortar merchants typically issue paper receipts to consumers, but may also, or alternatively, email the receipts to the consumers at provided email addresses. Virtual merchants typically provide receipts to the consumers in electronic form, for example, via email, or otherwise to accounts associated with the consumers and provided by the virtual merchants. Separately, from time to time, the consumers may return purchased products to the merchants, whereupon the consumers present their receipts to the merchants to verify the returned products. In turn, the merchants refund at least a portion of the purchase funds for the products to the consumers, for example, in the form of cash, or in the form of credit to the consumers' payment accounts.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transactions for the purchase of products (e.g., goods and services, etc.) generally result in receipts being provided to consumers, by the merchants, as proof of the purchases. When the products need to be returned, the consumers present the receipts to the merchants, whereupon the merchants are able to return/refund funds to the consumers, often in whatever form the funds were originally presented (e.g., cash, credit, etc.). Uniquely, the systems and methods herein provide a receipt vault (e.g., a receipt vault data structure, etc.), in which receipts for purchase transactions for products are stored and subsequently retrieved, as needed. In particular, in connection with a payment account transaction for the purchase of a product by a consumer at a merchant, a receipt engine intercepts an authorization message for the transaction and appends a vault location to the authorization message for a receipt vault. Upon receiving the authorization message (e.g., in the form of an authorization reply, etc.), the merchant transmits the receipt to the vault location for storage. Later, the consumer and/or the merchant can access the receipt, and other receipts, in the receipt vault, as needed, for example, for returning the product (or other products) included in the transaction represented by the receipt (or by other receipts in the receipt value) to the merchant. In this manner, the receipt vault provides an efficient mechanism for receiving, collecting, and otherwise managing receipts for payment account transactions by consumers.

Figure 1:
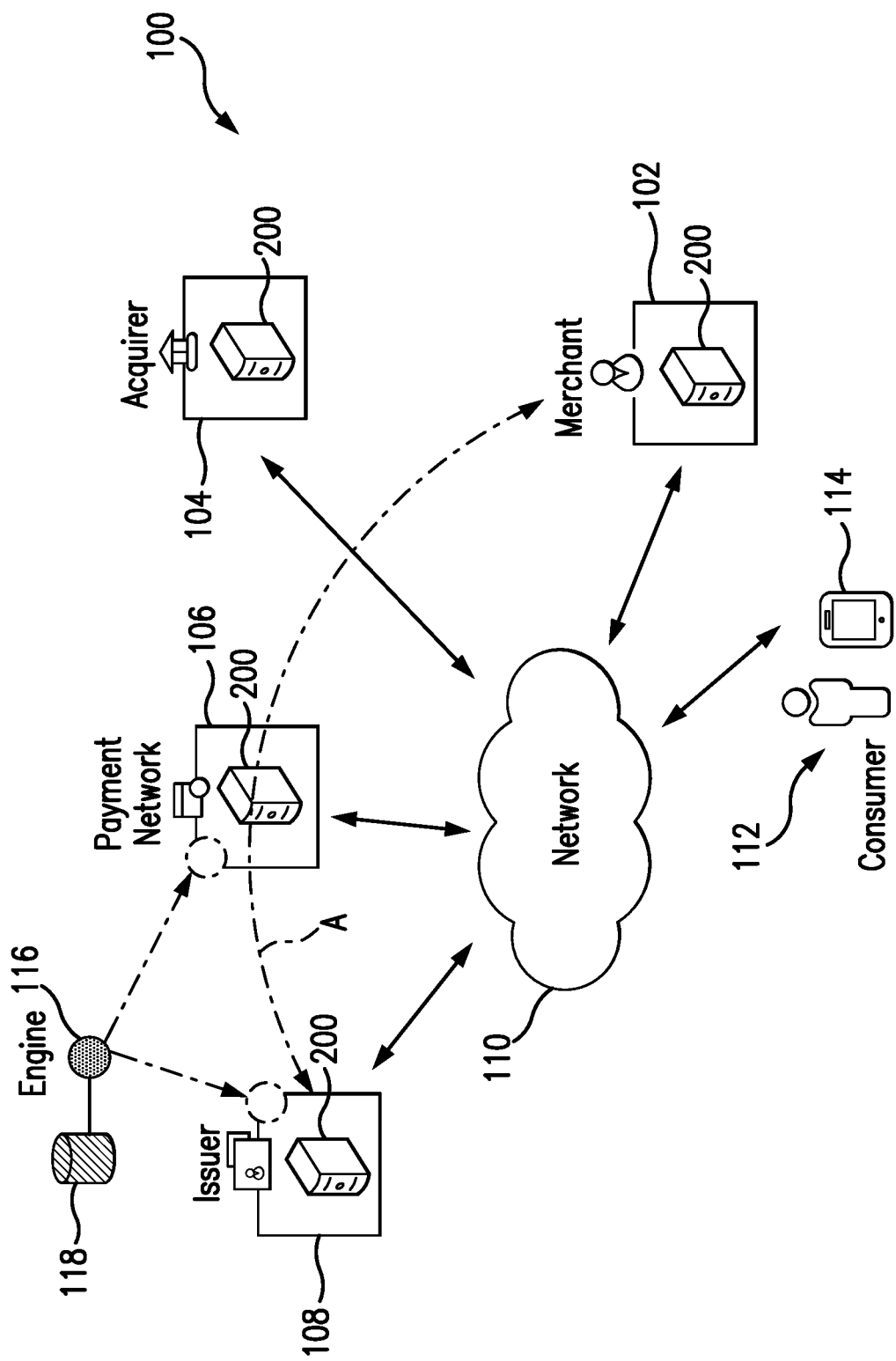
FIG. 1 is an exemplary system for use in managing receipts associated with payment account transactions for products.

FIG. 1 illustrates an exemplary system 100, in which the one or more aspects of the present disclosure may be implemented. Although the parts of the system 100 are presented in one arrangement, other embodiments may include the same or different parts arranged otherwise depending, for example, on authorization processes for payment account transaction, implementation of receipt vaults, etc.

The illustrated system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the acquirer 104, the payment network 106, the issuer 108, and/or a consumer 112.

Generally in the system 100, the merchant 102 offers for sale, and sells, products to consumers, including, for example, consumer 112. The merchant 102 may include a brick-and-mortar merchant, which includes one or more physical location at which the consumers are able to shop and/or purchase the products. Additionally, or alternatively, the merchant 102 may include virtual locations accessible, for example, via websites or other network-based applications, whereby the consumers are able to shop and/or purchase products from the merchant 102. In connection therewith, the consumer 112 is associated with a payment account issued to the consumer 112 by the issuer 108. The consumer 112 can use the payment account to purchase products from the merchant 102 (regardless of the merchant's type). As described more below, the merchant 102, the acquirer 104, the payment network 106, and the issuer 108 then generally cooperate, in response to the consumer 112 (e.g., in response to a purchase by the consumer 112), to complete a purchase transaction for the products from the merchant 102 when the consumer's payment account is employed.

Also in the system 100, the consumer 112 is associated with a communication device 114. The communication device 114 may include, for example, a smartphone, a tablet, a laptop a computer, etc. As described in more detail below, the consumer 112 may use the communication device 114 in connection with purchasing products from the merchant 102 using the consumer's payment account, and in connection with managing receipts received from the merchant 102 for such purchases.

With that said, in one example transaction, the consumer 112 initiates a purchase for a product by presenting, to the merchant 102, a payment device associated with his/her payment account. The payment device may include, for example, a credit card, a debit card, a pre-paid card, a payment token, a payment tag, a pass, another device used to provide an account number (e.g., communication device 114, etc.), etc. In turn, the merchant 102 reads the payment device (associated with the consumer's payment account) and, as is conventional, communicates an authorization message (and, more specifically, an authorization request) to the acquirer 104 via the network 110, generally consistent with path A in FIG. 1. The authorization message may include, for example, a primary account number (PAN) for the consumer's payment account and an amount of the purchase, etc. The acquirer 104, in turn, communicates the authorization message with the issuer 108, through the payment network 106 (via the network 110), for authorization of the transaction. The issuer 108 then determines if the consumer's payment account is in good standing and if sufficient credit/funds to complete the transaction is associated with the payment account.

In this example, if the issuer 108 approves/accepts the transaction, another authorization message (and, more specifically, an authorization reply) is provided back to the merchant 102 authorizing the transaction, and the merchant 102 completes the transaction. The credit line or funds associated with the consumer's payment account, depending on the type of payment account, is then decreased by the amount of the purchase, and the charge is posted to the payment account. The transaction is later cleared and settled by and between the merchant 102 and the acquirer 104 (in accordance with a settlement arrangement, etc.), and by and between the acquirer 104 and the issuer 108 (in accordance with another settlement arrangement, etc.). Conversely, if the issuer 108 declines the transaction, an authorization message (and, more specifically, an authorization reply) is provided back to the merchant 102 declining the transaction, and the merchant 102 can stop the transaction.

Transaction data is generated, collected, and stored as part of the above interactions among the merchant 102, the acquirer 104, the payment network 106, the issuer 108, and the consumer 112 (regarding the example transaction as well as other transactions). The transaction data represents at least a plurality of transactions, e.g., completed transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104, and/or the issuer 108 may store the transaction data, or part thereof, in a data structure. Transaction data may include, for example, payment account numbers (e.g., PANs, etc.), amounts of transactions, merchant IDs, merchant category codes (MCCs), dates/times of transactions, products purchased and related descriptions or identifiers, products refunded, receipt vault locations, etc. It should be appreciated that more or less information related to transactions, as part of either authorization and/or clearing and/or settling, may be included in transaction data and stored within the system 100, at the merchant 102, the acquirer 104, the payment network 106, and/or the issuer 108. Further, transaction data, unrelated to a particular payment account, may be collected by a variety of techniques, and similarly stored within the system 100.

In various exemplary embodiments, consumers (e.g., consumer 112, etc.) involved in the different transactions herein are prompted to agree to legal terms associated with their payment accounts, for example, during enrollment in their accounts, etc. and/or to application of the services described herein. In addition, the consumers may be prompted to approve and/or authorize use of the services described herein (e.g., use of the receipt vault services, etc.). In so doing, the consumers may voluntarily agree, for example, to allow merchants, issuers, payment networks, etc., gather/collect data for use as described herein (e.g., during enrollment and/or in connection with processing the transactions herein, etc.) and to use the collected data, subsequently, for one or more of the different purposes described herein.

With continued reference to FIG. 1, from time to time in the system 100, consumers, including the consumer 112 in the above exemplary transaction, may wish to return one or more products purchased from the merchant 102, following their payment account transactions. In connection therewith, the merchant 102 may impose certain restrictions on the return of products, including, for example, restrictions associated with the condition of the returned products, the date of purchase of the products to be returned (e.g., product returns may be limited to 30 days following product purchases, etc.), etc. If the consumer 112, for example, abides by the restrictions imposed by the merchant 102, the consumer 112 is then able to return a previously purchased product (e.g., the product purchased in the above exemplary transaction, etc.). In such instances, when the purchase was originally funded by a payment account, as in the above exemplary transaction, the return transaction is generally the same as described above, with reference to path A, except that the amount of the transaction is negative (i.e., to reflect a return/refund of funds to the consumer's payment account, rather than a debit).

While only one merchant 102, one acquirer 104, one payment network 106, one issuer 108, and one consumer 112 are illustrated in FIG. 1 (for ease of reference), it should be appreciated that a variety of other embodiments may include multiple ones of these entities in various combinations and, in some of these embodiments, even hundreds or thousands of certain ones of these entities.

Figure 2:
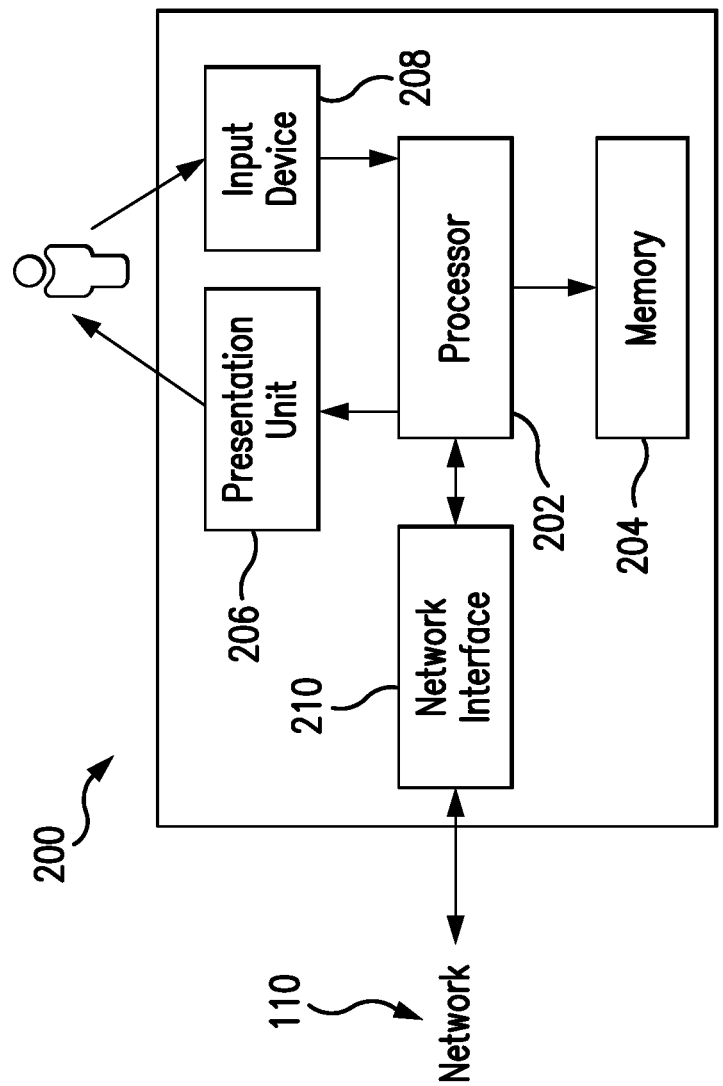
FIG. 2 is a block diagram of an exemplary computing device, suitable for use in the system of FIG. 1.

FIG. 2 illustrates an exemplary computing device 200 that can be used in the system 100. The computing device 200 may include, for example, one or more servers, workstations, personal computers, laptops, tablets, smartphones, point of sale (POS) terminals, other suitable computing devices, etc. In addition, the computing device 200 may include a single computing device, or it may include multiple computing devices located in close proximity, or multiple computing devices distributed over a geographic region, so long as the computing devices are specifically configured to function as described herein.

In the exemplary embodiment of FIG. 1, each of the merchant 102, the acquirer 104, the payment network 106, and the issuer 108 are illustrated as including, or being implemented in, computing device 200, coupled to (and in communication with) the network 110. In addition, the communication device 114 associated with the consumer 112 should be understood to be consistent with computing device 200. However, the system 100 should not be considered to be limited to the computing device 200, as described below, as different computing devices and/or arrangements of computing devices may be used in other embodiments. Further, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may include one or more data structures, and may further be configured to store, without limitation, transaction data, receipt vault data structures, receipts, receipt IDs, consumer profiles, vault locations (as part of transaction data or otherwise), and/or other data and/or other data structures usable as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. It should be appreciated that the memory 204 may include a variety of different memories, each implemented in connection with one or more of the operations described herein.

In the exemplary embodiment, the computing device 200 includes a presentation unit 206 (or an output device or a display device) that is coupled to (and in communication with) the processor 202 (however, it should be appreciated that the computing device 200 could include output devices other than the presentation unit 206, etc.). The presentation unit 206 outputs information (e.g., receipts, notifications, etc.), either visually or audibly to a user, for example, the consumer 112 in the system 100, manager(s) and/or employee(s) associated with the merchant 102, etc. It should be further appreciated that various interfaces (e.g., network-based application interfaces (e.g., webpages, etc.), etc.) may be displayed at computing device 200, and in particular at presentation unit 206, to display information, such as, for example, consumer profiles, registration forms, receipts, return options, or other data, in the form of interfaces, or otherwise, as described herein, etc. The presentation unit 206 may include, without limitation, a liquid crystal display (LCD), a light-emitting diode (LED) display, an organic LED (OLED) display, an "electronic ink" display, etc. In some embodiments, presentation unit 206 includes multiple devices.

The computing device 200 also includes an input device 208 that receives inputs from the user of the computing device 200 (i.e., user inputs), such as, for example, selections of receipts, search requests for receipts, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes a receipt engine 116, which is specifically configured, by executable instructions, to perform one or more of the operations herein. The receipt engine 116 may be considered to be consistent with the computing device 200. In addition, the receipt engine 116 is illustrated as a stand-alone part in the system 100 (e.g., as a third-party provider, etc.). However, as indicated by the dotted arrow lines in FIG. 1 extending therefrom, the receipt engine 116 may alternatively be associated with, or incorporated with, the payment network 106 and/or the issuer 108. Further, in various other embodiments, it should be appreciated that the receipt engine 116 may be associated with, or incorporated with (in whole or in part), still other parts of the system 100, for example, the merchant 102, the acquirer 104, etc.

As shown, the receipt engine 116 is coupled to a receipt vault data structure 118 (broadly, a receipt vault). And, while the receipt vault data structure 118 is illustrated as separate from the receipt engine 116, it could be incorporated therein in memory 204, for example. In addition, or alternatively, the receipt vault data structure 118 may be included (or incorporated) at least partly in the payment network 106 and/or the issuer 108 in various embodiments.

Generally, the receipt vault data structure 118 includes two types of data: consumer profile data (e.g., consumer profiles, etc.) and receipt data (e.g., receipts, etc.). The different types of data may be organized together in a single data structure, or segregated into multiple data structures that then form the receipt vault data structure 118. In connection with the consumer profile data, consumer profiles are generated through the receipt engine 116 as part of a registration process, as described below, and include at least a consumer's payment account number and vault location (e.g., an email address, etc.). Each of the consumer profiles may further include the consumer's name/contact information, receipt access credentials, additional information related to the consumer's payment account, receipt preferences (e.g., access permissions, format, etc.), etc. In connection with the receipt data, receipts for various transactions are stored in the receipt vault data structure 118, as receipt records. In general, each receipt record in the data structure 118 includes, without limitation, an indication of the product(s) purchased in the corresponding transaction, a purchase amount for the product(s), and a description of the product(s), etc. Each receipt record may further include a total amount for the purchase, along with tax and/or other fees and/or charges associated therewith. With that said, the data structure 118 is configured and/or formatted in such a way, then, to permit searching (via a search request, etc.) for a particular receipt based on one or more of a receipt ID, a merchant ID (or name), a transaction date/time, a product name/description, a stock keeping unit (SKU) number, a mobile number used in the transaction, an email address used in the transaction, a user identifier number, etc.

In the illustrated system 100, the receipt engine 116 is configured to register the consumer 112, and other consumers, and their payment accounts, to the receipt vault data structure 118. The receipt engine 116 is configured to also register the merchant 102, and other merchants. In particular, regarding registration of the consumer 112, the receipt engine 116 is configured to permit the consumer 112 to opt into or register for receipt vault services described herein, for example, via a standalone receipt application at the consumer's communication device 114, or as part of another application at the communication device 114 (e.g., a virtual wallet application, etc.). In connection with such registration, the receipt engine 116 may cause various registration interfaces (e.g., forms, etc.) to display to the consumer 112 at the consumer's communication device 114 (or at another computing device). In turn, the receipt engine 116 is configured to solicit information from the consumer 112, via the interfaces, such as for example, name, contact information, payment account number (e.g., PAN, etc.) for the particular payment account to be registered, preferences, etc., as part of generating a consumer profile for the consumer 112, and to then designate the consumer 112 and/or the associated payment account as registered. The receipt engine 116 is configured to then store the consumer profile, including the registered payment account for the consumer 112, in the receipt vault data structure 118.

Once the consumer 112 (and other consumers) and their payment accounts are registered, the receipt engine 116 is configured to cause receipts for transactions performed by the consumer 112 (and other registered consumers) to be stored in the receipt vault data structure 118, as receipt records. In particular, the receipt engine 116 is configured to modify the conventional processing of payment account transactions (generally described above) and intercept authorization messages (e.g., authorization requests, authorization replies, etc.) for payment account transactions that are associated with registered payment accounts (and registered consumers). In so doing, the receipt engine 116 may be configured to intercept all authorization messages, and then determine if the authorization messages are associated with a registered payment account (e.g., by accessing and/or searching the consumer profiles in the receipt vault data structure 118, etc.), or to intercept only those authorization messages associated with payment accounts registered in the receipt vault data structure 118 (e.g., based on a range of PANs for registered payment accounts, etc.). In either case, once intercepted, the receipt engine 116 is configured to append vault locations (e.g., as addresses, as binary strings, etc.), associated with the payment accounts (e.g., in the receipt vault data structure 118, etc.), to the authorization messages (e.g., to data elements in the authorization messages, etc.) as appropriate (again, as a further modification to the conventional processing of payment account transactions). The receipt engine 116 is configured to then release the authorization messages, so that they may proceed to the intended part of the system, for example, the merchant 102, the acquirer 104, the payment network 106, and/or the issuer 108, as is then conventional.

In the exemplary transaction above (between the consumer 112 and the merchant 102), the receipt engine 116 may intercept the authorization reply (from the issuer 108) and append a vault location for the consumer's payment account thereto (based on the consumer's profile) (e.g., append an email address associated with the vault location to a data element of an ISO 8583 authorization reply message, etc.). The vault location may include an email address, or other indicator allowing for proper direction of the receipt by the merchant 102 (as described below). The vault location for the consumer's payment account may be carried to the merchant 102 via the authorization reply. In turn, upon receipt of the vault location, the merchant 102 is configured to transmit the receipt for the exemplary transaction to the specified vault location so that the receipt may be stored. The receipt engine 116 is configured to then receive the receipt from the merchant 102 and to determine whether the merchant 102 is an authorized sender. If the merchant 102 is an authorized sender (e.g., is registered with the receipt engine 116 in a similar fashion to that described above for the consumer 112, etc.), the receipt engine 116 is further configured to store the receipt, as a receipt record, in the receipt vault data structure 118 (in a location designated by the vault location). However, if the merchant 102 is not an authorized sender (e.g., if the merchant 102 is not registered to the receipt engine 116, etc.), the receipt engine 116 is configured to discard the receipt.

Further in the system 100, the receipt engine 116 is configured to provide access to the receipt vault data structure 118 to the merchant 102 and to the consumer 112, for example, to facilitate return of a product by the consumer 112 to the merchant 102. In connection therewith, the receipt engine 116 is configured to respond to a request for a receipt from the merchant 102, by accessing the receipt vault and providing the receipt record for the requested receipt (e.g., based on a search for the merchant ID, etc.). The receipt record, when found, may then be transmitted to the merchant 102 via a message through the payment network 106 (e.g., via an ISO message, etc.), or it may be transmitted directly to the merchant 102 (e.g., as an email, etc.) via network 110 (e.g., via the Internet, etc.). Similarly, the receipt engine 116 is configured to respond to a request for a receipt from the consumer 112, by accessing the receipt vault and providing the receipt record for the requested receipt (e.g., based on a search for a name of the consumer 112, the PAN of the consumer's payment account, etc.). The receipt record may then be transmitted to the consumer 112 directly (e.g., as an email, etc.) via network 110 (e.g., via the Internet, etc.), or via one of the applications (or parts thereof) at the consumer's communication device 114 (e.g., the receipt application (or potentially the consumer's e-wallet application) may be configured to communicate with the receipt engine 116, and to provide the consumer 112 with access to receipts ultimately stored in the receipt vault data structure 118; etc.).

The receipt engine 116 is configured to also receive a notification, from the merchant 102, of the return and/or impending return of the product, and to annotate the receipt record (or otherwise modify/update the record) in the receipt vault data structure 118 to indicate the return. For example, the merchant 102 may transmit a new, altered receipt to the vault location for the consumer's payment account relating to the return, wherein the product being returned is removed from the receipt but the previously purchased products remain on the receipt (e.g., with the altered receipt including a new reference receipt identifier number as a binary string encode, etc.). Or, the merchant 102 may simply provide a return status update to the vault location for the consumer's payment account relating to the existing receipt for the product, such that the receipt engine 116 can then update the record for the product (and the associated existing receipt) in the receipt vault data structure 118 to indicate the return. In addition, once the return is processed by the issuer 108, the receipt engine 116 is configured to receive a notification from the issuer 108 that appropriate funds have been refunded to the consumer's payment account. In response, the receipt engine 116 is configured to further alter (or otherwise modify/update) the receipt record in the receipt vault data structure 118 to reflect the completed return of the product and the processed return of funds to the consumer 112. For example, the issuer 108 may provide a transaction ID to the receipt engine 116, for the returned product, that relates to the receipt ID in the receipt vault data structure 118 and, which together with the date/time of the initial transaction for the product, is unique such that the existing receipt for the product can be identified in the receipt vault data structure 118. The receipt engine 116 may then provide a further notification to the consumer 112, indicating the returned amount and providing a link to the receipt value data structure 118 to view the receipt details.

It should be appreciated that in addition to, or alternatively to, the above, the receipt engine 116 and/or the data structure 118 may be configured otherwise to perform any of the operations described herein.

Figure 3:
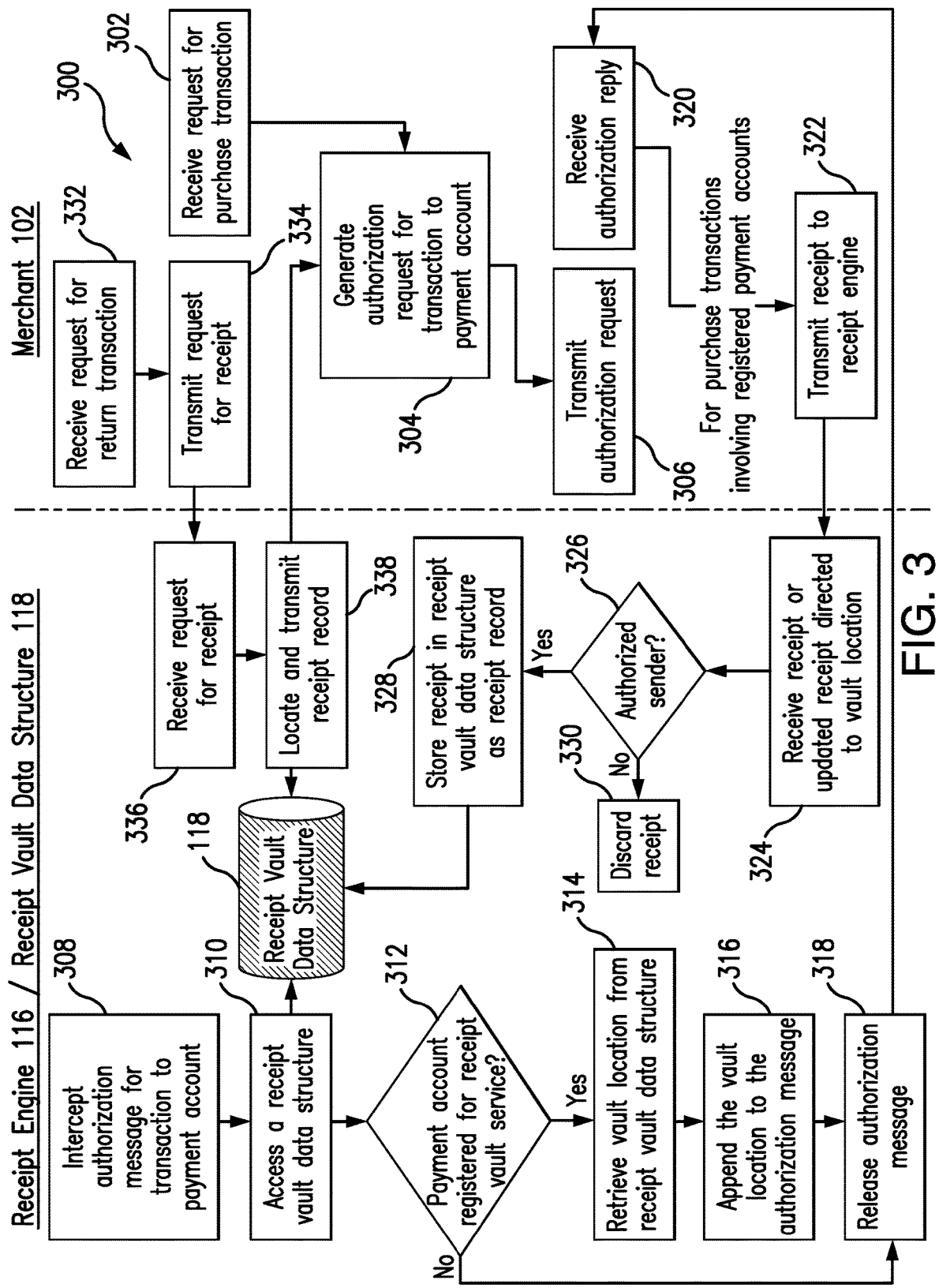
FIG. 3 is an exemplary method, which can be implemented via the system of FIG. 1, for managing a receipt associated with a payment account transaction for a product by a consumer at a merchant.

FIG. 3 illustrates an exemplary method 300 for use in managing a receipt for a payment account transaction between a consumer and a merchant. The exemplary method 300 is described as implemented in the receipt engine 116 of the system 100, in conjunction with the exemplary transaction between the merchant 102 and the consumer 112. However, the method 300 is not limited to the system 100. Further, for purposes of illustration, the exemplary method 300 is described herein with reference to the computing device 200, but should not be considered limited thereto. Likewise, the systems and the computing devices herein should not be understood to be limited to the exemplary method 300.

As described above, in the exemplary transaction between the merchant 102 and the consumer 112, the consumer initiates the transaction by presenting payment account credentials to the merchant 102 for the consumer's payment account. This may include presenting to the merchant 102 (e.g., to computing device 200, another computing device in communication therewith, etc.) a payment device associated with the consumer's payment account (where the payment account credentials may include, for example, the PAN for the payment account, an expiration date for the payment device, and a card verification code (CVC) for the payment device, etc.). Or, this may include directly providing the payment account credentials to the merchant 102 (e.g., typing the PAN for the consumer's payment account at a website provided by the merchant 102, etc.).

In turn in the method 300, the merchant 102 receives the consumer's request for the payment account transaction (broadly, for a purchase transaction), at 302. The merchant 102 then generates (e.g., via computing device 200, etc.) an authorization request (broadly, an authorization message) for the transaction, at 304. As described above, the authorization request may include, among other things (and without limitation), the PAN for the consumer's payment account (and potentially other payment account credentials) and an amount of the purchase. And, the merchant 102 then transmits (e.g., via computing device 200, etc.) the authorization request, at 306 (e.g., as an ISO 8583 message, etc.), to the issuer 108 (via the acquirer 104 and the payment network 106), for example, for review and approval as described above in the system 100 (e.g., along path A in FIG. 1, etc.).

In response, the receipt engine 116 (e.g., processor 202 associated therewith, etc.) intercepts an authorization message associated with the authorization request for the transaction, at 308. This may include intercepting the authorization request for the transaction as it is transmitted from the merchant 102 to the issuer 108. Or, this may include intercepting the authorization reply for the transaction as it is transmitted from the issuer 108 back to the merchant 102 (e.g., when the transaction is approved, but not when the transaction is declined; etc.). In either case, in so doing, the receipt engine 116 accesses the receipt vault data structure 118, at 310, and searches in the consumer profile data for the consumer profile of the consumer 112 (e.g., based on a name of the consumer 112, the PAN for the consumer's payment account, etc.).

Next, at 312, the receipt engine 116 determines if the consumer's payment account (as identified in the intercepted authorization message) is registered with the receipt engine 116, at 312 (for the exemplary receipt vault service described herein). This may include, for example, simply identifying that the consumer's profile is present in the receipt vault data structure 118 (e.g., determining that the PAN included in the authorization reply is associated with an email address for the consumer 112 or a mobile number for the consumer, or with a user reference identifier for the consumer 112, via a web-service look up; etc.). Or, it may further include determining if a registration indication is present in the consumer's profile. Regardless, when the consumer's payment account is registered with the receipt engine 116 (e.g., is included in the receipt vault data structure 118, etc.), the receipt engine 116 retrieves a vault location associated with the payment account from the receipt vault data structure 118, at 314 (e.g., from the consumer profile for the consumer 112, etc.). In turn, the receipt engine 116 appends the vault location to the authorization message, at 316, and releases the authorization message, at 318, so that it can be transmitted to its intended recipient (e.g., the issuer 108, the merchant 102, etc., as is then conventional). For example, when the authorization message includes the authorization request for the transaction, the receipt engine 116 releases the authorization request, at 318, so that it can be transmitted to the issuer 108. Then, if the transaction is approved by the issuer 108, an authorization reply (including the vault location) is transmitted from the issuer 108 to the merchant 102 (as described above). Alternatively, when the authorization message includes the authorization reply (from the issuer 108), the receipt engine 116 may append the vault location to the authorization reply (as intercepted from the issuer 108) (e.g., only when the authorization reply includes an approval of the transaction, etc.) and then release the authorization reply, at 318, to the merchant 102.

However, when the consumer's payment account is not registered with the receipt engine 116, the receipt engine 116 simply releases the authorization message, at 318, so that it can be transmitted to its intended recipient (e.g., the issuer 108, the merchant 102, etc.).

With continued reference to FIG. 3, after the authorization message is released by the receipt engine 116 (at 318), the merchant 102 eventually receives the authorization reply for the transaction (as associated with the released authorization message), at 320 (e.g., at computing device 200, etc.). In response, and based on the authorization reply, the merchant 102 either approves the transaction and delivers the appropriate product to the consumer 112 (along with a receipt for the transaction, either physically or electronically), or declines the transaction (and, potentially, requests alternative forms of payment to complete the transaction). In addition in the method 300, when the transaction is approved by the issuer 108 (i.e., when the authorization reply received by the merchant 102 (at 320) indicates that the transaction is approved), and involves a registered payment account (i.e., a vault location for the consumer's payment account is present in the authorization reply), the merchant 102 further transmits the receipt for the transaction to the receipt engine 116, at 322, and the receipt vault data structure 118 associated therewith (based on the indicated vault location included in the authorization reply for the transaction).

The receipt engine 116, then, receives the receipt from the merchant 102, at 324, along with an indicator of the vault location for the consumer's payment account (as used in the transaction associated with the receipt). In response, the receipt engine 116 determines, at 326, if the merchant 102 is an authorized sender (e.g., the receipt engine 116 determines if the merchant 102 is registered to the receipt engine 116, etc.). If the merchant 102 is an authorized sender, the receipt engine 116 stores the receipt, at 328, in the receipt vault data structure 118 as a receipt record (e.g., in association with the consumer profile for the consumer 112, in association with the merchant 102 and/or a profile for the merchant 102, in a searchable digital data format, etc.). However, if the merchant 102 is not an authorized sender, the receipt engine 116 discards the receipt, at 330.

Separately in the method 300, when the consumer 112 desires to return the product to the merchant 102 (for one or more different reasons), the merchant 102 receives the return request from the consumer 112, at 332 (for a return transaction). The consumer 112 may present the return request to the merchant 102 in person (at a physical location of the merchant 102), or electronically (e.g., at a virtual location of the merchant such as a website, etc.). In any case, in response to the return request, the merchant 102 transmits a request to the receipt engine 116, at 334, for the receipt associated with the transaction for the product to be returned. The request may include, without limitation, an indication of the merchant (e.g., a merchant name, a merchant ID, etc.), an indication of the consumer 112 (e.g., the consumer's name, etc.), an indication of the consumer's payment account (e.g., the PAN, etc.), an indication of the product being returned, an indication of the reason for the return, etc.

In turn, the receipt engine 116 receives the request for the receipt from the merchant 102, at 336, and searches in the receipt vault data structure 118 for the receipt. This may include, for example, searching in the receipt data (included in the receipt vault data structure 118) for the receipt based on one or more of the merchant 102 (e.g., the merchant's name, etc.), the consumer 112 (e.g., the consumer's name, etc.), the returned product, the consumer's payment account, or combinations thereof. Then, at 338, the receipt engine 116 locates the receipt and transmits the receipt (or a copy thereof) to the merchant 102. As described above, the receipt, when found, may then be transmitted to the merchant 102 via a message through the payment network 106 (e.g., via an ISO message, etc.), or it may be transmitted directly to the merchant 102 (e.g., as an email to an email address specified by the merchant 102 in the request for the receipt (at 334) or during registration of the merchant 102 to the receipt engine 116, etc.) via network 110 (e.g., via the Internet, etc.).

Further in the method 300, in connection with the request by the consumer 112 to return the product, the merchant 102 generates an authorization request for the return of the product, at 304 (i.e., for the return transaction), for a refund of the purchase price of the product to the consumer's payment account originally used by the consumer 112 to purchase the product. The merchant 102 then transmits the authorization request for the return transaction, at 306, to the issuer 108 (via the acquirer 104 and the payment network 106), for example, for review and approval as described above (e.g., along path A in FIG. 1, etc.). In turn, the receipt engine 116 intercepts an authorization message associated with the return transaction (e.g., the authorization request, an authorization reply, etc.), at 308, and again performs operations 310-318 (for the return transaction) as described above to identify the consumer's payment account in the receipt vault data structure 118.

Next, at 320, the merchant 102 eventually receives the authorization reply for the return transaction (e.g., at computing device 200, etc.). In response, and based on the authorization reply, the merchant 102 either approves the return transaction and provides an updated receipt to the consumer 112 indicating the return, or declines the transaction. When the return transaction is approved (i.e., when the authorization reply received by the merchant 102 (at 320) indicates that the transaction is approved), and when the return transaction involves a registered payment account (i.e., a vault location, as determined at 310-318, for the consumer's payment account is present in the authorization reply), the merchant 102 further transmits the receipt/updated receipt for the return transaction (and the vault location for the consumer's payment account) to the receipt engine 116, at 322. For example, the merchant 102 may transmit a new, altered receipt to the vault location for the consumer's payment account relating to the return, wherein the product being returned is removed from the receipt but the previously purchased products remain on the receipt (e.g., with the altered receipt including a new reference receipt identifier number as a binary string encode to allow for tracking the transaction, etc.). Or, the merchant 102 may simply provide a return status update to the vault location for the consumer's payment account relating to the existing receipt for the product, such that the receipt engine 116 can then update the record for the product (and the associated existing receipt) in the receipt vault data structure 118 to indicate the return.

Then, at 324, the receipt engine 116 receives the receipt/updated receipt for the return transaction from the merchant 102, along with an indicator of the vault location for the consumer's payment account. In response, the receipt engine 116 determines, at 326, if the merchant 102 is an authorized sender. If the merchant 102 is an authorized sender, the receipt engine 116 stores the receipt/updated receipt for the return transaction, at 328, in the receipt vault data structure 118 as an updated receipt record (e.g., in association with the consumer profile for the consumer 112, in association with the merchant 102 and/or a profile for the merchant 102, etc.). In so doing, the receipt engine 116 may annotate the receipt record (or otherwise modify/update the record) in the receipt vault data structure 118 to indicate the return. In addition, once the return is processed by the issuer 108, the receipt engine 116 may receive a further notification that appropriate funds have been refunded to the consumer's payment account (and then further update the receipt records in the data structure 118). However, if the merchant 102 is not an authorized sender, the receipt engine 116 discards the receipt, at 330.

In view of the above, the systems and methods herein provide receipt vaults, in/from which receipts for purchase transactions for products are stored and subsequently retrieved, as needed. In connection therewith, the systems and methods modify conventional operations of processing purchase transactions, by intercepting authorization messages relating to the transactions and appending vault locations to the authorization messages for the appropriate receipt vaults relating to the payment accounts used in the transactions. Then, upon receiving the authorization messages (e.g., in the form of authorization replies, etc.), the merchants involved in the transactions can identify the vault locations and transmit the receipts for the transactions thereto for storage. Later, the consumers and/or the merchants can access the receipts, as needed, from the receipt vaults. In this manner, addresses for the receipt vaults are uniquely and efficiently, but unconventionally, provided to the merchants via the authorization messages used in processing (e.g., authorizing, etc.) the underlying transactions.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) intercepting an authorization message associated with a transaction involving a payment account and a merchant; (b) accessing a profile for the payment account, the profile including a vault location in a receipt vault data structure specific to the payment account; (c) appending the vault location to the authorization message, whereby the merchant is permitted to deposit a receipt for the transaction at the vault location in the receipt vault data structure; (d) receiving a receipt for a transaction from the merchant and storing the receipt in the receipt vault data structure; (e) receiving a request for the receipt from the merchant; and (f) retrieving the receipt from the receipt vault data structure and transmitting the receipt to the merchant.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing receipts related to payment account transactions, the method comprising:

intercepting and holding, by a receipt engine computing device included in a payment network or an issuer, an authorization message transmitted via the payment network, the authorization message associated with a transaction involving a payment account and a merchant;

identifying, by the receipt engine computing device, in a receipt vault data structure, a profile for the payment account based on an account number associated with the payment account and included in the authorization message, the receipt vault data structure included in the payment network or the issuer;

accessing, by the receipt engine computing device, the profile for the payment account, the profile including a vault location in the receipt vault data structure specific to the payment account;

appending, by the receipt engine computing device, the vault location to the authorization message;

releasing, by the receipt engine computing device, the authorization message with the appended vault location for further transmission, whereby the merchant is permitted to deposit a receipt for the transaction at the vault location in the receipt vault data structure upon receiving the authorization message;

receiving, by the receipt engine computing device, the receipt for the transaction transmitted by the merchant in response to receiving the released authorization message; and storing, by the receipt engine computing device, the received receipt for the transaction in the receipt vault data structure at a location associated with the vault location.

2. The computer-implemented method of claim 1, wherein the vault location includes an email address.

3. The computer-implemented method of claim 1, further comprising rejecting a message directed to the receipt vault data structure, when the sender of the message is not the merchant.

4. The computer-implemented method of claim 1, wherein the transaction involves a payment account transaction for a product at the merchant; and
wherein the authorization message includes an authorization reply from an issuer associated with the payment account.

5. The computer-implemented method of claim 4, wherein appending the vault location to the authorization message includes appending the vault location to the authorization reply only when the authorization reply includes an approval of the transaction.

6. The computer-implemented method of claim 5, wherein the authorization reply includes an authorization reply message consistent with the ISO 8583 standard, as of the filing date of the instant application; and
wherein appending the vault location to the authorization message includes appending the vault location to an un-used data element of the authorization reply message.

7. The computer-implemented method of claim 5, further comprising directing the authorization reply, with the vault location appended thereto, to the merchant, whereby the merchant can either complete or terminate the transaction based on the authorization reply.

8. The computer-implemented method of claim 4, further comprising receiving, by the receipt engine computing device, a request for the receipt from the merchant; and
retrieving, by the receipt engine computing device, the receipt from the receipt vault data structure and transmitting the receipt to the merchant.

9. The computer-implemented method of claim 1, wherein the transaction involves a return transaction, returning a product to the merchant for a refund.

10. A system for use in managing receipts related to payment account transactions, the system comprising:
a memory comprising a receipt vault data structure having a receipt vault, the receipt vault associated with a payment account issued to a consumer and including a profile for the consumer, the receipt value data structure included in a payment network or an issuer; and
an engine, included in the payment network or the issuer, the engine in communication with the memory and configured to:
identify an authorization message for a transaction associated with the payment account included in the receipt vault and intercept the authorization message as the authorization message is transmitted via the payment network;
identify the profile for the consumer based on an account number associated with the payment account and included in the intercepted authorization message;
retrieve a vault location for the receipt vault in the memory from the profile for the consumer and append the vault location to the authorization message;
release the authorization message with the vault location for the receipt vault included therein, thereby permitting the merchant when in receipt of the authorization message to forward a receipt for the transaction to the receipt vault, in the memory, based on the vault location; and
receive the receipt from the merchant for the transaction and store the receipt in the receipt vault in the memory at a location associated with the vault location included in the released authorization message.

11. The system of claim 10, wherein the vault location includes an email address;
wherein the authorization message includes an authorization reply from an issuer associated with the payment account, the authorization reply either approving or declining the transaction; and
wherein the engine is configured, in connection with releasing the authorization message, to direct the authorization reply, with the vault location appended thereto, to the merchant, whereby the merchant can either complete or terminate the transaction based on the authorization reply.

12. The system of claim 10, wherein the engine is further configured to:
receive a request for the receipt from the merchant; and
retrieve the receipt from the receipt vault in the memory and transmit the receipt to the merchant.

* * * * *